US006128782A

United States Patent [19]

Young et al.

[11] Patent Number: 6,128,782

[45] Date of Patent: Oct. 10, 2000

[54] COMBINATION CLOTHING/SAFETY HARNESS FOR FALL ARRESTING AND RESCUE FROM CONFINED SPACES

[76] Inventors: David A. Young, 27689 Joyce Dr.; Jonnathan Mark Townsend, 10217 DuPont Rd., both of Columbia Station, Ohio 44028

[21] Appl. No.: 09/295,449

[22] Filed: Apr. 21, 1999

[51] Int. Cl.$^7$ .......................... A41D 13/00; A62B 35/00; B64D 17/00

[52] U.S. Cl. .............................. 2/69; 2/79; 2/456; 182/3; 244/151 R

[58] Field of Search .................................. 2/69, 102, 79, 2/94, 456, 44, 45, 69.5, 338, 227; 182/3–6; 244/151 R

[56] References Cited

U.S. PATENT DOCUMENTS

| | | | |
|---|---|---|---|
| 2,709,667 | 5/1955 | Grubb et al. . | |
| 2,979,153 | 4/1961 | Hoagland et al. . | |
| 3,424,134 | 1/1969 | Rosenblum | 119/96 |
| 3,701,395 | 10/1972 | Theobald | 182/3 |
| 4,076,101 | 2/1978 | Himmelrich . | |
| 4,177,877 | 12/1979 | Gallinati | 182/3 |
| 4,273,216 | 6/1981 | Weissmann . | |
| 4,302,847 | 12/1981 | Miles . | |
| 4,731,882 | 3/1988 | Ekman . | |
| 4,745,870 | 5/1988 | Roth . | |
| 5,036,548 | 8/1991 | Grilliot et al. . | |
| 5,136,724 | 8/1992 | Grilliot et al. . | |
| 5,220,976 | 6/1993 | Gunter | 182/3 |
| 5,738,046 | 4/1998 | Williams et al. . | |
| 5,960,480 | 10/1999 | Neustater et al. | 2/456 |
| 5,970,517 | 10/1999 | Jordan | 2/69 |

FOREIGN PATENT DOCUMENTS

| | | |
|---|---|---|
| 218467 | 7/1924 | United Kingdom . |
| 1233761 | 5/1971 | United Kingdom . |

*Primary Examiner*—John J. Calvert
*Assistant Examiner*—Tejash Patel
*Attorney, Agent, or Firm*—Richard C. Litman

[57] ABSTRACT

A combination clothing/safety harness for fall arresting and rescue from confined spaces provides the advantages of ease of use, distribution of forces over a wide surface area, protection of the harness portion, and ease of enforcing regulations that the harness be worn. The safety harness may be attached to various articles of clothing, such as a jacket, vest, overalls, or coveralls, so that donning the article of clothing automatically positions the harness for use. The harness may be used by employees working at dangerous heights or in confined spaces, or by hunters using tree stands. Combination clothing/safety harness systems can be made to meet OSHA requirements.

14 Claims, 8 Drawing Sheets

COMBINATION CLOTHING/SAFETY HARNESS FOR FALL ARRESTING AND RESCUE FROM CONFINED SPACES

BACKGROUND OF THE INVENTION

1. Field of the Invention

The present invention relates to safety garments and fall arresting harnesses. Specifically, the invention is an article of clothing having an attached harness for connection to a safety line.

2. Description of the Related Art

The need for protection from falls has long been felt by employees in dangerous professions, such as construction work, utility repairmen, and many others who must work at dangerous heights. The minimum requirements for such protection are described in 29 C.F.R. § 1926.502. The need has also been felt by hunters, who frequently wait for game sitting in elevated tree stands. Additionally, workers entering confined spaces face certain risks, such as lack of oxygen, or being injured while in a location with limited access for rescuers. The Occupational Health and Safety Administration also requires some entrants into confined spaces to wear body harnesses for attachment to a retrieval line. U.S. Department of Labor, Occupational Health and Safety Administration, Permit-Required Confined Spaces 11 (1998).

Given the importance of such safety precautions, it is no surprise that several other inventors have proposed various body harnesses for fall arresting. However, no other safety harness within the knowledge of the present invention combines all of the advantages of ease of use, distribution of forces over the widest possible surface area, protection of the harness itself by the clothing, and ease of enforcement of rules requiring use of the harness.

An example of protective clothing unrelated to fall arresting systems is U.S. Pat. No. 2,709.667, issued to Robert Grubb and Donald Nusbaum on May 31, 1955, describing a fire fighter suit. The suit includes a helmet, jacket, and overalls made from fiberglass fabric. The overalls include a harness having a chest strap and a crotch strap, with a lift ring in back for attachment of a rescue line.

U.S. Pat. No. 2,979,153, issued to Earl J. Hoagland and Lawrence E. Dickson on Apr. 11, 1961, describes a safety suit. The safety suit includes a coverall garment having a harness system. The harness system includes a noose passing around each arm and leg, connecting at the back of the neck to a ring for connecting to a rescue line.

U.S. Pat. No. 4,076,101, issued to Lew Himmelrich on Feb. 28, 1978, describes a coat having a harness. The harness passes around the wearer's waist and crotch, and connects to a descent control device in front.

U.S. Pat. No. 4,273,216, issued to Rita H. Weissmann on Jun. 16, 1981, describes a jacket having an outer harness with shoulder and waist straps for anchoring the user in case he loses his footing. The straps are sewn to the jacket and to corresponding straps inside the jacket.

U.S. Pat. No. 4,302,847, issued to Bertrand H. Miles on Dec. 1, 1981, describes a jacket and pants having foam inserts protecting the lower back and hips.

U.S. Pat. No. 4,731,882, issued to Tommy Ekman on Mar. 22, 1988, describes a waistcoat or coverall including channels for a harness. The harness includes a belt, a pair of shoulder straps passing diagonally across the back and vertically across the front, attaching to the belt, and possibly a pair of crotch straps. The garment includes a D-ring in back for connecting to a safety line.

U.S. Pat. No. 4,745,870, issued to Jon P. Roth on May 24, 1988, describes a windsurfing harness. The harness passes across the back of the arms and shoulders, and has a hook or glove at either end for holding the windsurfer to the sailboard boom.

U.S. Pat. No. 5,036,548, issued to William L. Grilliot and Mary L. Grilliot on Aug. 6, 1991, describes a firefighter's combination trousers and safety harness. The safety harness includes a belt and a loop extending around each leg. A loop and ring extends upward from the front of the trousers for connection to a safety line. A similar invention is described in U.S. Pat. No. 5,136,724, also issued to William L. Grilliot and Mary L. Grilliot on Aug. 11, 1992.

U.S. Pat. No. 5,738,046, issued to Tommie Ann Williams and David A. Williams on Apr. 14, 1998, describes a safety jacket and harness system. The harness includes a pair of torso straps, a pair of shoulder straps, and a central back strap having a ring for connection with a safety line. The jacket includes a plurality of flaps for snapping around the harness.

Great Britain Pat. No. 218,467, published on Jul. 10, 1924, describes a harness for raising or lowering a person. The harness is made from rope fastened with brass rings. It has three loops: one fitting around the torso, and one for each leg.

Great Britain Pat. No. 1,233,761, published on May 26, 1971, describes a safety harness including front and back buoyant material.

None of the above safety systems offers the advantages of ease of use, wide distribution of forces, protection of the safety harness, and ease of enforcement offered by the present invention. None of the above inventions and patents, taken either singularly or in combination, is seen to describe the instant invention as claimed. Thus a combination clothing/safety harness for fall arresting and rescue from confined spaces solving the aforementioned problems is desired.

SUMMARY OF THE INVENTION

The invention is a combination article of clothing and safety harness intended for fall arresting and for rescue from confined spaces. Such a harness is useful for both working at dangerous heights and in confined spaces, and for hunting from a tree stand.

The article of clothing combined with the harness may be varied and selected as needed, with preferred and suggested articles of clothing being jackets, vests, overalls, and coveralls. Such garments provide ample fabric for sewing in a harness extending around the shoulders, waist, and crotch, thereby maximizing the surface area acted upon by the harness.

If a jacket or vest is used, the harness will have straps extending around the arms, waist, and crotch, connected by straps extending across the back. A pair of back straps will extend diagonally down the back, meeting in the center of the back between the shoulder blades. A D-ring attachment strap will extend upward from the juncture of the back straps, extending past the collar and protruding outside the jacket for connection with a safety line. The bottom of the back straps join a belt. Horizontal arm straps extend outward from the back straps, encircling each arm. A pair of crotch straps extend downward from the belt. Additional D-rings may be located at belt level. By donning the jacket or vest, buckling the crotch straps around each leg, and buckling the belt, the wearer has properly put on the harness.

If the clothing is a pair of overalls, the suspenders of the overalls form part of the harness. Each suspender crosses diagonally across the front and back of the torso, and then wraps around the opposite leg. A D-ring attachment strap extends from the rear juncture of the two suspenders, protruding outward from the overalls. Additional D-rings may be attached at waist level.

If the clothing is coveralls, the harness is similar to that used with the overalls, modified to accommodate the zipper in front of typical coveralls. A shoulder strap extends vertically downward across the front of the torso, and diagonally downward across the back. The strap extending from the front of the left shoulder wraps around the left leg, and connects to the strap extending from the rear of the right shoulder. Likewise, the strap extending from the front of the right shoulder wraps around the right leg, and connects to the strap extending from the rear of the left shoulder. A D-ring attachment extends upward from the juncture of the two rear shoulder straps, protruding from the collar. Additional D-rings may be attached at waist level.

If the combination clothing/safety harness is used in the course of employment of the wearer, it must meet the requirements of the Occupational Safety and Health Administration. Specifically, the attachment point for a safety line must be in the center of the wearer's back, near shoulder level. D-rings must have a minimum tensile strength of 5,000 lb., and be proof tested to a minimum of 3,600 lb. Buckles must be drop-forged, made of pressed or formed steel, or made of equivalent materials. The harness must be made of synthetic fibers. The overall system must limit the maximum arresting force on the wearer to 1,800 lb. 29 C.F.R. § 1926(d). If the combination clothing/safety harness is used for hunting or other recreational activities, OSHA regulations do not apply, but the harness must still be capable of safely arresting a fall of the wearer.

The combination clothing/harness has important advantages for meeting the above requirements, and for ensuring compliance. By using a garment that the employee would likely wear anyway, the harness will always be present, increasing the likelihood that it will be attached to a safety line when required. The garment will be sized to fit the wearer, thereby increasing the comfort of the harness therein. The harness may be made adjustable in length by conventional means, further increasing comfort. Donning the garment automatically positions the harness in the proper position for use, thereby eliminating the necessity of struggling with a complex arrangement of straps. Attaching the harness to the inside of the garment protects it from adverse weather conditions, prolonging its useful life. Labels on the garment may identify the garment as one containing a harness, and may additionally specify the last inspection date, thereby simplifying enforcement of safety requirements by the employer and by OSHA inspectors. If the wearer does fall, or must be rescued from a confined space, the attachment of the harness to the clothing allows the clothing to increase the surface area bearing against the user, so that the same force results in decreased pressure created by the harness.

Accordingly, it is a principal object of the invention to provide a combination clothing/safety harness allowing for correct positioning of the harness by donning the clothing.

It is another object of the invention to provide a combination clothing/safety harness providing for wearer comfort.

It is a further object of the invention to provide a combination clothing/safety harness meeting OSHA requirements.

Still another object of the invention is to provide a combination clothing/safety harness allowing for ease of enforcement of safety regulations.

An additional object of the invention is to provide a combination clothing/safety harness which will reduce the pressure applied to the wearer during a fall through the attachment of the harness to the clothing, increasing the surface area against which the force of arresting the fall is distributed.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a combination clothing/safety harness, intended for use as a fall arresting system or as a rescue system for confined spaces. The harness can be combined with different types of clothing, with preferred and suggested choices being a jacket or overalls. The harness includes one or more D-rings for attachment to a safety line.

Figure 2:
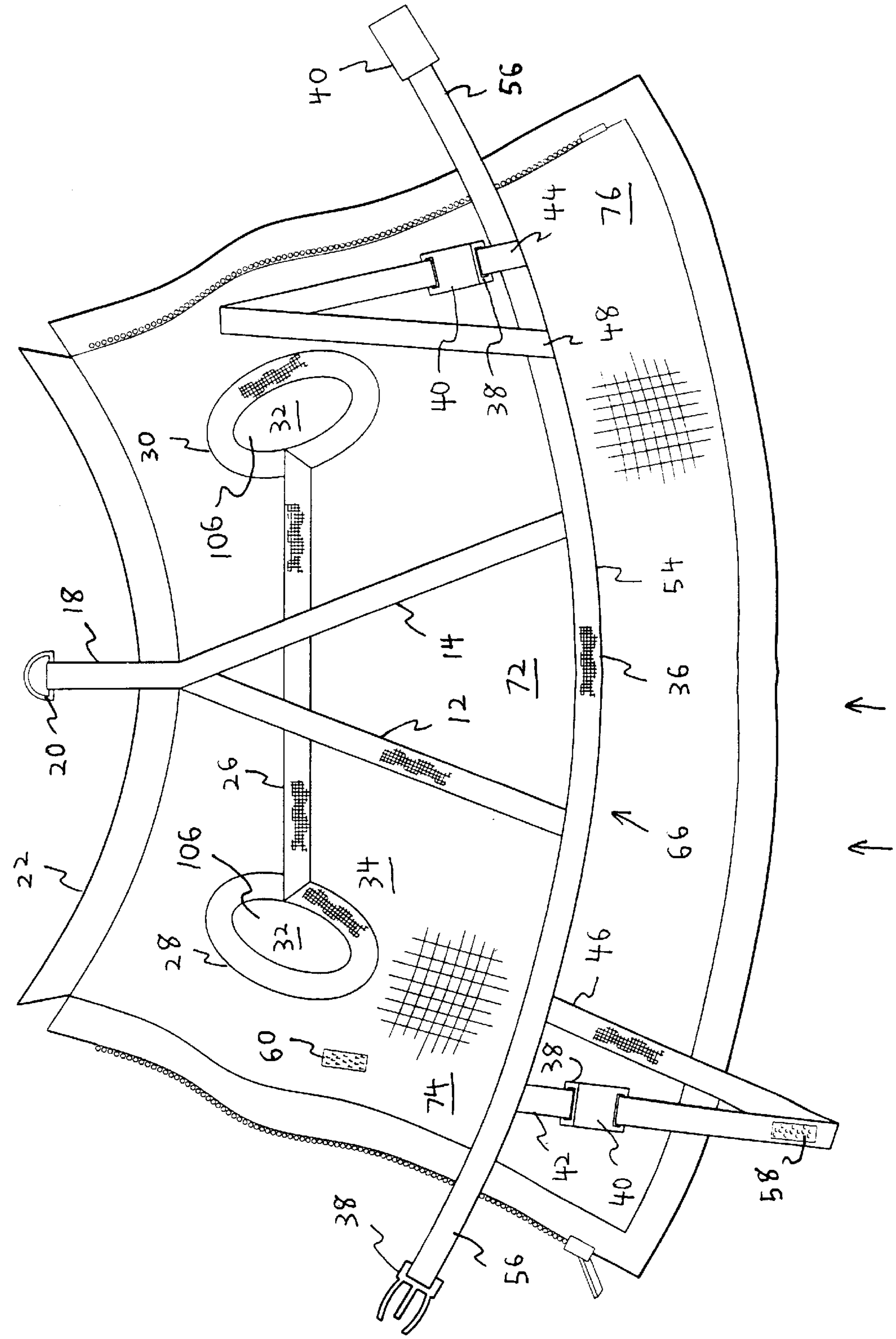
FIG. 2 is a front view of the inside of a combination jacket/safety harness according to the present invention.
Figure 3:
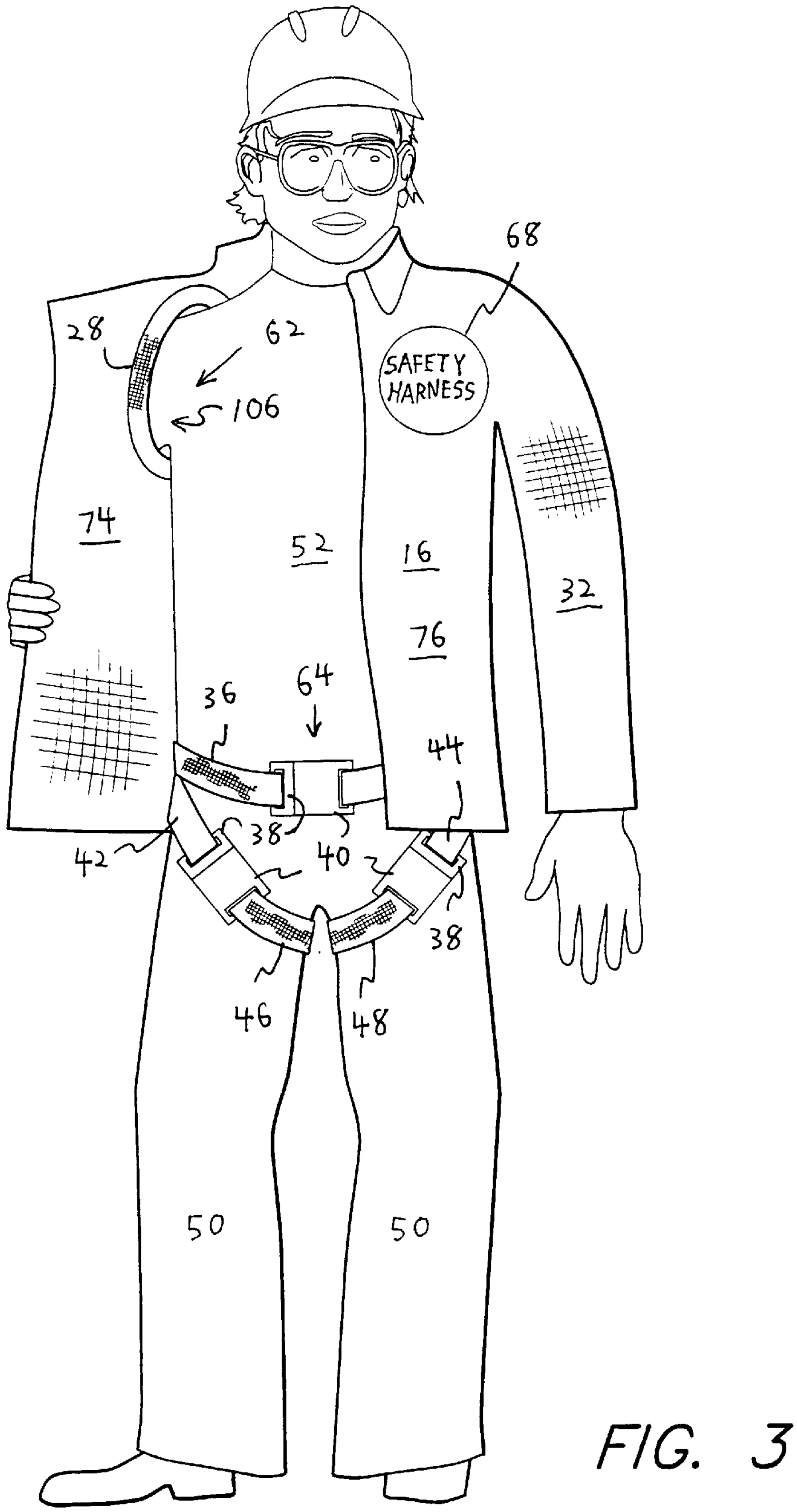
FIG. 3 is an environmental, perspective view of a combination jacket/safety harness according to the present invention, showing placement of the harness resulting from wearing the jacket.
Figure 8:
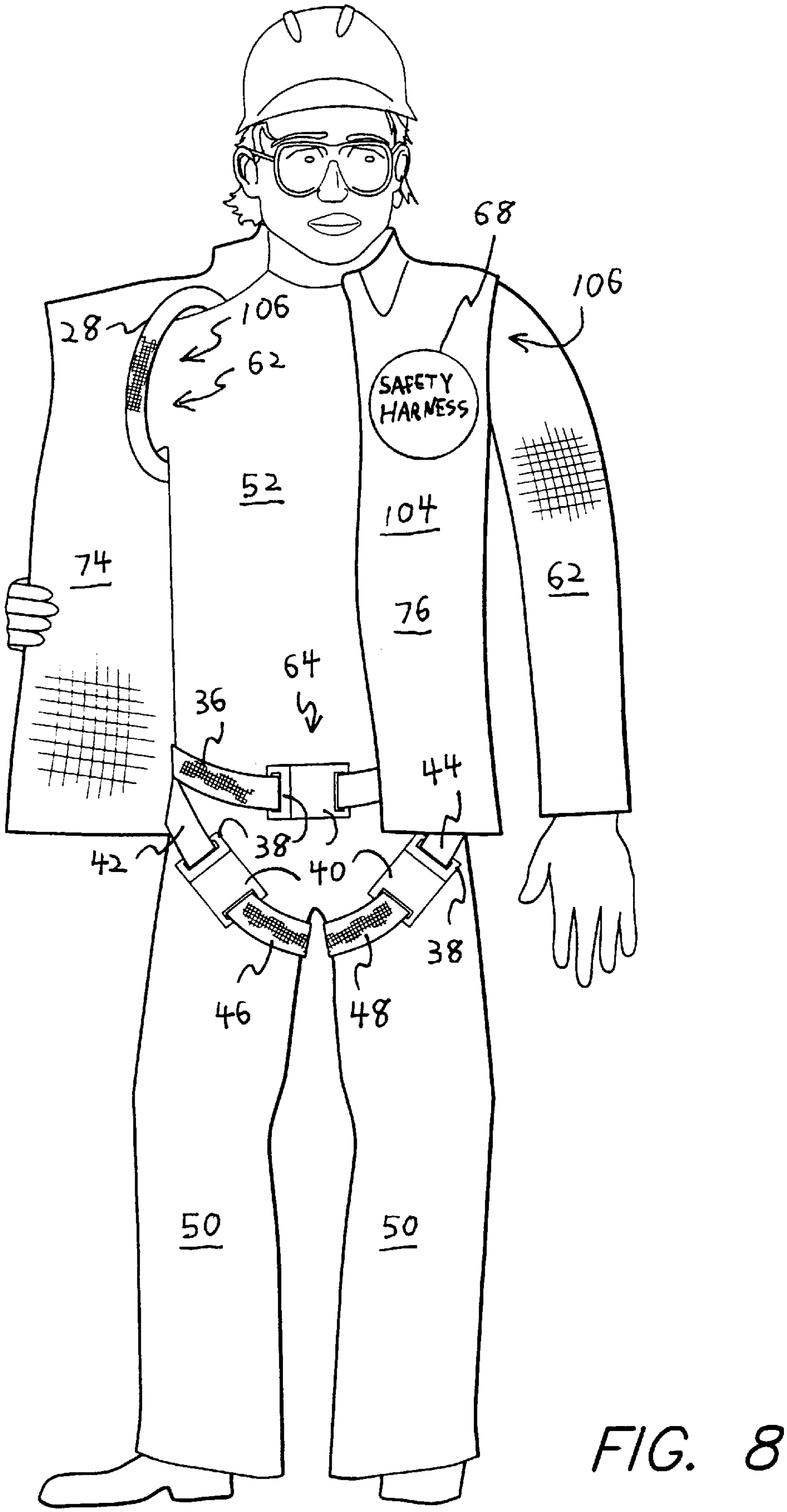
FIG. 8 is an environmental, perspective view of a combination vest/safety harness according to the present invention.

A preferred and suggested embodiment of the combination clothing/safety harness includes an upper body garment. Referring to FIGS. 2–3, a combination safety harness/jacket 10 is shown. The jacket 16 includes torso portion 34, having rear panel 72 and front panels 74,76, defining armholes 106 therebetween for attached sleeves 32. FIG. 8 shows a combination safety harness/vest 104, having an safety harness 66 identical to that used in the jacket 16. The jacket 16 and vest 104 will therefore be described simultaneously.

Figure 1:
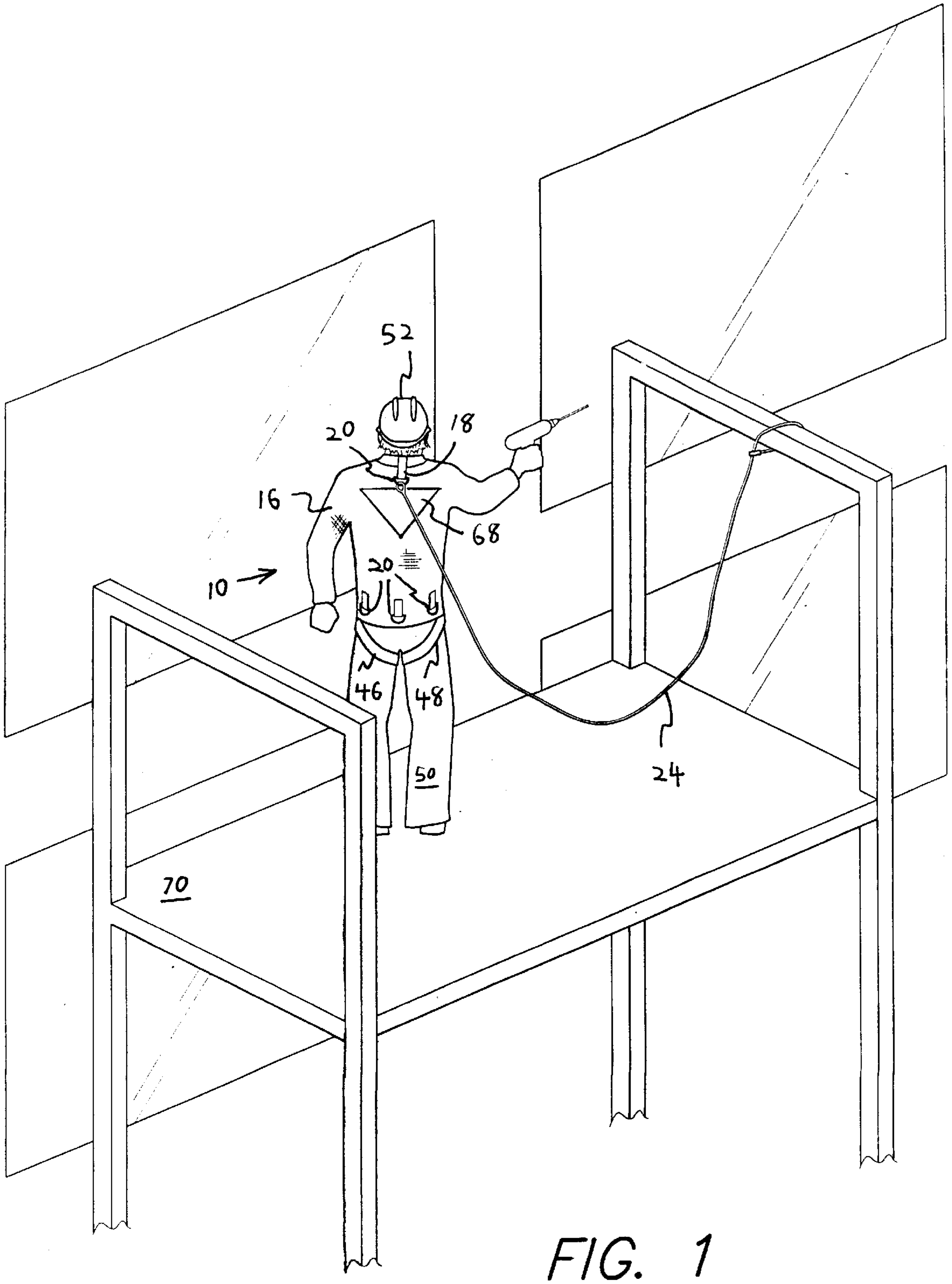
FIG. 1 is an environmental, perspective view of a combination jacket/safety harness for fall arresting and rescue from confined spaces according to the present invention.

The safety harness 66 is attached to the inside of jacket 16 or vest 104, preferably by stitching. The safety harness 66 includes a pair of back straps 12,14 extending diagonally down the back of the jacket 16. Back straps 12,14 connect at their upper portion, forming D-ring attachment strap 18, having D-ring 20. D-ring attachment strap 18 extends upward beyond the collar 22 of jacket 16, positioning D-ring 20 outside the jacket 16, so that it is centered between the wearer's shoulders, for attachment of a safety line 24 (FIG. 1).

Horizontal arm strap 26 extends horizontally across the back of jacket 16, connecting to back straps 12,14, and connecting at each end to arm encircling straps 28,30. The arm encircling straps 28,30 encircle the armholes 106 of jacket 16, or vest 104. The back straps 12,14, the horizontal arm strap 26, and arm encircling straps 28,30 are all attached to the jacket 16 along their entire length, preferably by stitching.

Belt 36 extends horizontally across the jacket or vest's torso portion 34, connecting to the bottom of back straps 12,14. The belt 36 is attached to the jacket 16 or vest 104, preferably by stitching, along its central portion 54, corresponding to back panel 72, and detached at end portions 56, corresponding to front panels 74,76. Mating buckle portions 38,40 are joined to each end portion 56 of belt 36. Front crotch straps 42,44, and rear crotch straps 46,48, attach to belt 36 directly underneath each sleeve 32 or armhole 106, at the juncture between back panel 72 and front panels 74,76. The belt 36 is attached to the jacket 16 or vest 104, preferably by stitching, along its central portion 54, corresponding to back panel 72, and detached at end portions 56, corresponding to front panels 74,76. Each rear crotch strap 42,44 includes a buckle portion 40, and each front crotch strap includes a corresponding buckle portion 38. Rear crotch straps 46,48 are longer than front crotch straps 42,44, thereby ensuring that the mating buckle portions 38,40 connect in front of the legs 50 of wearer 52, making them accessible to the wearer. It is suggested that the rear crotch straps 46,48 include hook and loop component 58, for mating with hook and loop component 60 located on the jacket or vest's torso portion 34 adjacent to sleeves 32, thereby securing the crotch straps 42,44,46,48 within the jacket 16 when not in use. Belt end portions 56, and crotch straps 42,44,46,48, preferably use conventional means for adjusting their length.

The jacket 16 or vest 104 preferably includes labels 68, having indicia designating the jacket 16 or vest 104 as one containing a safety harness. The labels 68 may optionally include information regarding OSHA approval or the last inspection date. The labels 68 thereby allow employers or OSHA inspectors to verify that proper safety equipment is being used.

Referring to FIGS. 1, 3, and 8, when wearer 52 dons jacket 16 or vest 104, his arms 62 are placed within arm encircling straps 28,30 by simply inserting the arms 62 into the sleeves 32 or armholes 106 as one typically dons a jacket or vest. Belt 36 is automatically positioned around the wearer's waist 64. Crotch straps 42,44,46,48 are automatically positioned adjacent to the wearer's legs 50. By connecting the mating buckle portions 38,40 of belt 36 and mating crotch straps 42,44,46,48, the wearer is now wearing the harness. Attaching safety line 24 to D-ring 20 protects the wearer from falls while working atop scaffold 70. Please note that safety line 24 is represented diagrammatically, and because safety lines are well known, no attempt has been made to illustrate the safety 24 line according to OSHA specifications.

Jacket 16 and vest 104 preferably include additional D-rings 20 located at waist level, stitched to jacket 16 or vest 104 so that the stitching secures the D-rings 20 to belt 36. These additional D-rings may be used either to secure a safety line 24 to either side of wearer 52, or to secure a position limiting line (not shown) to the rear of wearer 52, preventing him from approaching anywhere a danger of falling exists.

Figure 4:
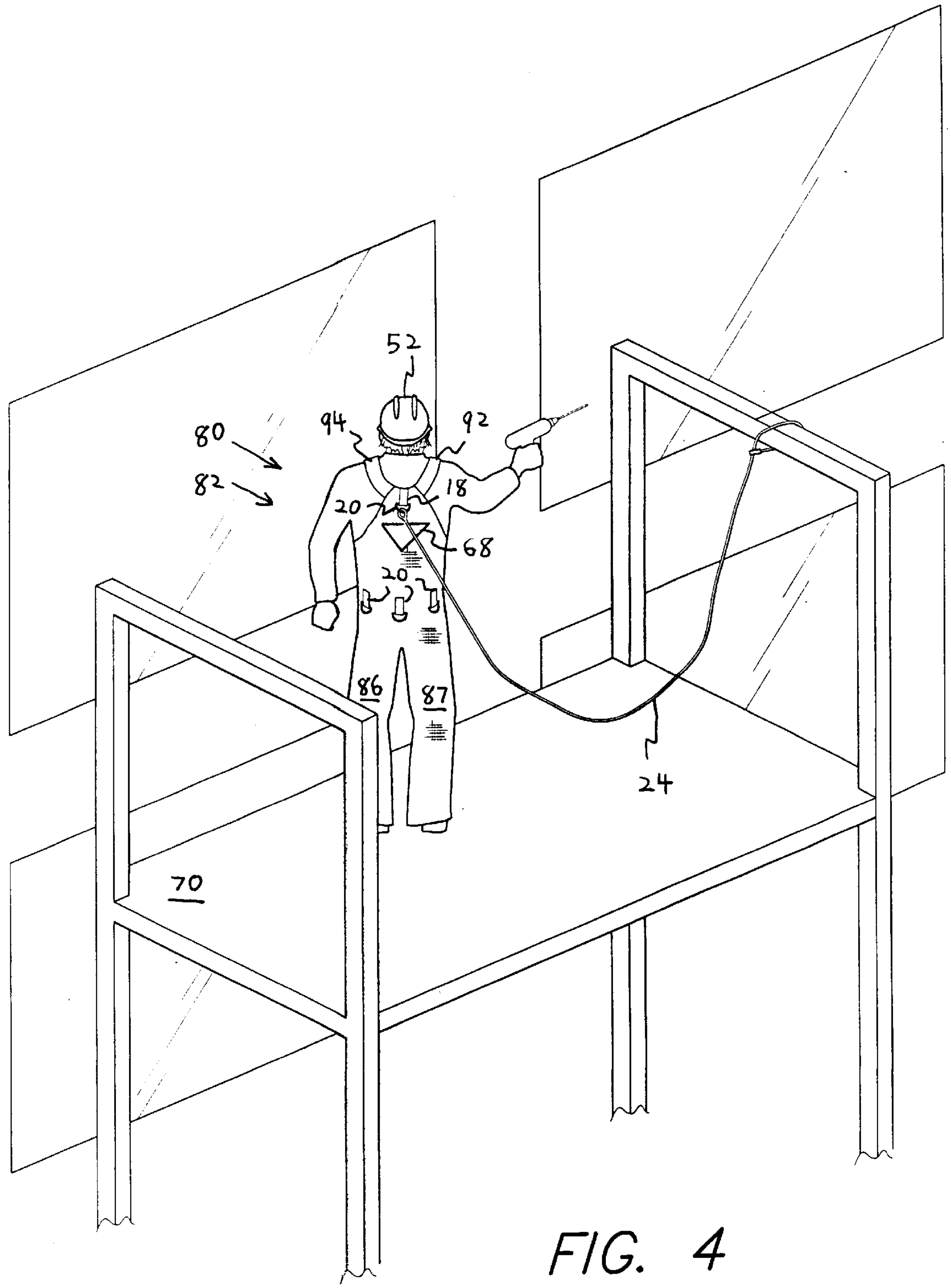
FIG. 4 is an environmental, perspective view of a combination overalls/safety harness according to the present invention.
Figure 5:
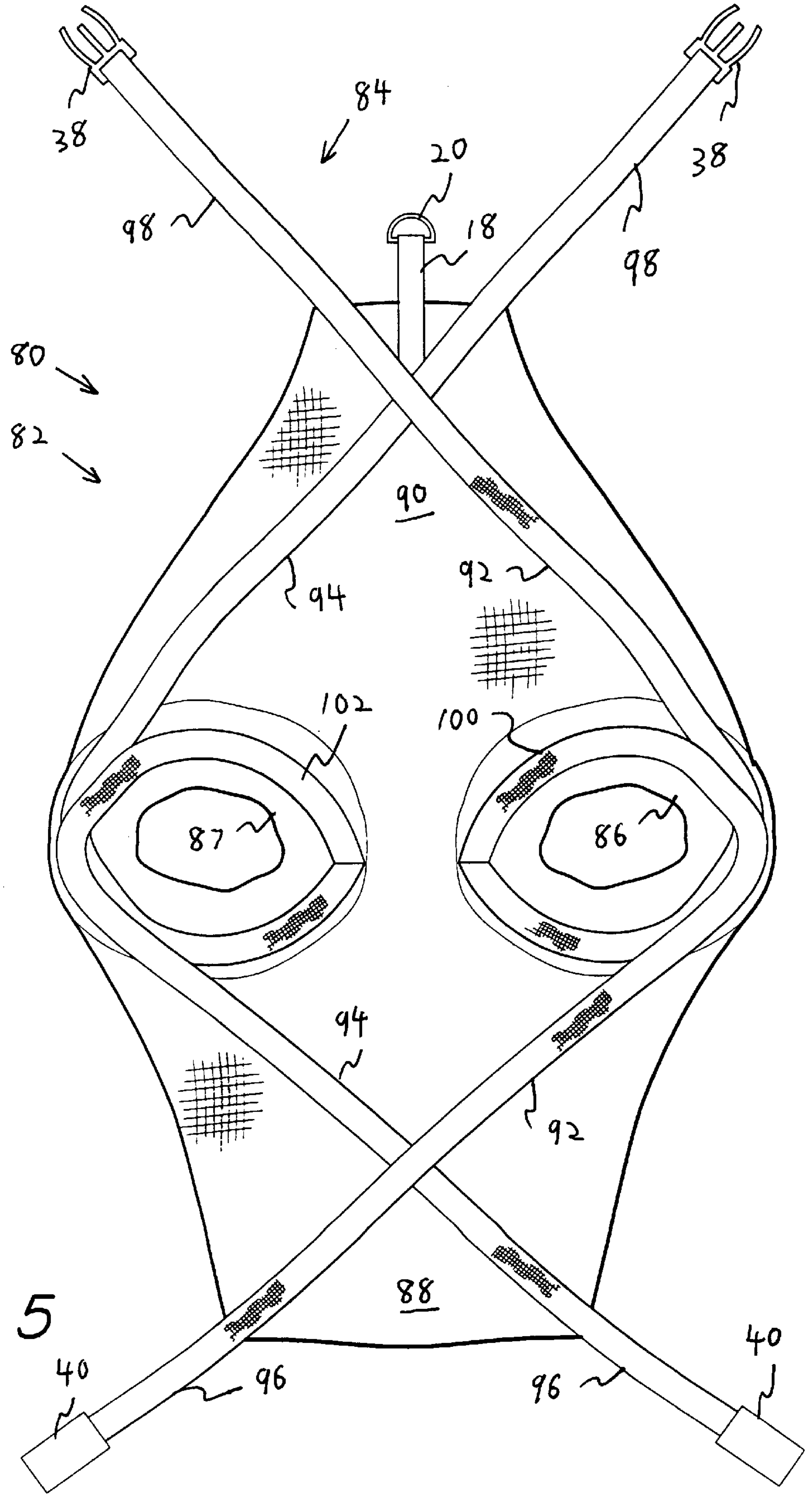
FIG. 5 is a top view of the inside of a combination overalls/safety harness according to the present invention.

A second preferred embodiment of the combination clothing/safety harness includes a full body garment, such as overalls or coveralls. Referring to FIGS. 4 and 5, a combination overalls/safety harness 80 is shown. The combination overalls/safety harness 80 includes overalls 82 and safety harness 84. Overalls 82 include a pair of legs 86,87, a bib 88, and a back panel 90.

Harness 84 includes a pair of straps 92,94. Each strap 92,94 includes a front suspender portion 96 and a rear suspender portion 98, forming both the shoulder portion of harness 84 and the suspenders of overalls 82. Rear suspender portion 98 includes buckle portion 38, and front suspender portion 96 includes the corresponding buckle portion 40. Rear suspender portions 98 are longer than front suspender portions 96, thereby placing mating buckle portions 38,40 within easy reach of wearer 52.

Straps 92,94 both attach to bib 88 below front suspender portions 96, joining each other, and then extend diagonally towards the opposite side leg, with strap 92 extending towards leg 86, and strap 94 extending towards leg 87. Strap 92 encircles leg 86, forming crotch strap 100, and strap 94 encircles leg 87, forming crotch strap 102. Each strap 92,94 then extends diagonally upward across back panel 90, joining each other, and continuing to extend upwards until forming rear suspender portions 98. Straps 92,94 are preferably attached along their entire length between the suspender portions 96,98 to overalls 82, preferably by stitching. The length of suspender portions 96,98 may be adjusted by well known conventional means.

D-ring attachment strap 18 extends upward from the crossing of straps 92,94 on rear panel 90, positioning D-ring 20 outside of overalls 82, centrally on the back of wearer 52, between his shoulders. Additional D-rings 20 may attach to overalls 82 at waist level, for use with safety lines 24 or with position limiting lines.

The overalls 82 preferably include label 68, having indicia designating the overalls 82 as containing a safety harness. The label 68 may optionally include information regarding OSHA approval or the last inspection date. The label 68 thereby allows employers or OSHA inspectors to verify that proper safety equipment is being used.

By placing legs 50 within legs 86,87 of the overalls, user 52 automatically positions the crotch straps 100,102 around his legs 50. Suspender portions 96,98 are automatically positioned around the torso, so that joining the buckle portions 38,40, as one would to don overalls, completes the process of putting on the harness. Connecting safety line 24 to D-ring 20 allows wearer 52 to safely work on scaffold 70.

Figure 6:
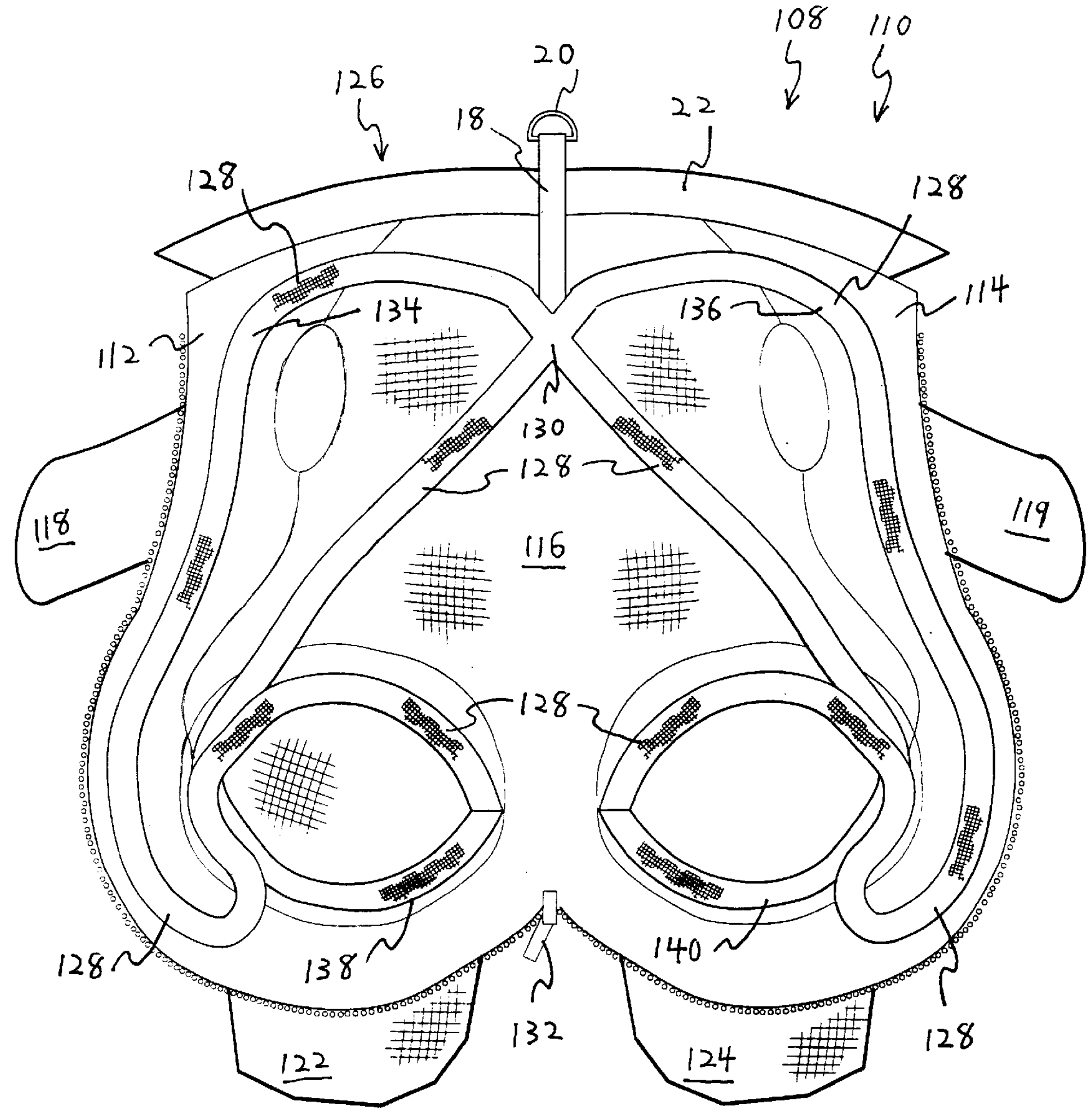
FIG. 6 is a top perspective view of the inside of a combination coveralls/safety harness according to the present invention.
Figure 7:
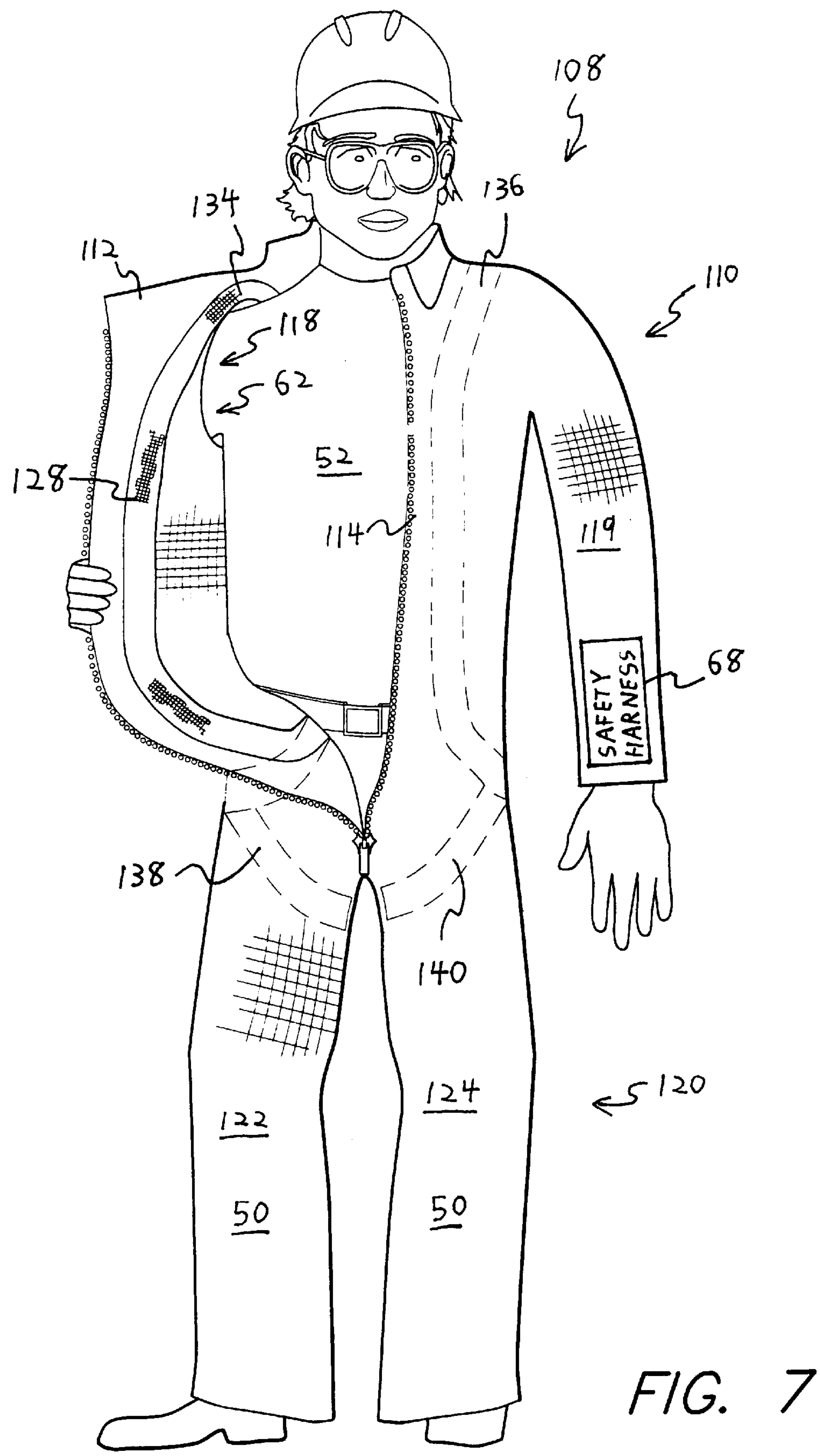
FIG. 7 is an environmental, perspective view of a combination coveralls/safety harness according to the present invention.

Referring to FIGS. 6–7, a combination safety harness/coveralls is illustrated. Coveralls 108 include a torso portion 110 having right front panel 112, left front panel 114, rear panel 116, and right and left sleeves 118,119, and a pants portion 120 including right leg 122 and left leg 124. The harness 126 includes a strap 128, extending vertically along right front panel 112 from above sleeve 118 to right leg 122. The strap 128 wraps around right leg 122, and extends diagonally across rear panel 116, above sleeve 119, and vertically along left front panel 114. Strap 128 continues around left leg 124, extending diagonally across rear panel 116, crossing over and attaching to itself at intersection 130, and finally extending towards front panel 112 above sleeve 118, thereby forming a single continuous loop. Defined within the single continuous loop are suspender portions 134,136, and crotch straps 138,140. The strap 128 is stitched to coveralls 108 along its entire length, and to itself at intersection 130. D-ring extension strap 18 extends upward from rear panel 128 at the intersection 130, terminating above collar 22, and securing D-ring 20. The D-ring 22 is thereby positioned centrally on the back of wearer 52 for attachment of safety line 24.

The coveralls 108 preferably include label 68, having indicia designating the coveralls 108 as containing a safety harness. The label 68 may optionally include information regarding OSHA approval or the last inspection date. The label 68 thereby allows employers or OSHA inspectors to verify that proper safety equipment is being used.

By placing legs 50 within legs 122,124 of the coveralls 108, user 52 automatically positions the crotch straps 138, 140 around his legs 50. Suspender portions 134,136 are automatically positioned over the wearer's shoulders when the wearer inserts his arms 62 into the sleeves 118,119. Zipping the zipper 132, as one would to don coveralls, completes the process of putting on the harness. Connecting safety line 24 to D-ring 20 allows wearer 52 to safely work on scaffold 70.

Both embodiments of the invention have been illustrated as fall-arresting systems for construction workers. However, they may be used in like manner as rescue systems for confined spaces. Just as a safety line 24 connected to D-ring 20 will arrest the fall of wearer 52, it will also allow co-workers to lift wearer 52 from a confined space without entering the confined space. Such a rescue could become necessary if a lack of oxygen or harmful chemicals are discovered within the confined space.

If the combination clothing/safety harness is used in the course of employment of the wearer, it must meet the requirements of the Occupational Safety and Health Administration. Specifically, D-ring 20 must be in the center of the wearer's back, near shoulder level. D-rings 20 must have a minimum tensile strength of 5,000 lb., and be proof tested to a minimum of 3,600 lb. Buckles 38,40 must be drop-forged, made of pressed or formed steel, or made of equivalent materials. The harness must be made of synthetic fibers. The overall system must limit the maximum arresting force on the wearer to 1,800 lb. 29 C.F.R. § 1926(d).

The combination clothing/safety harness could also be used for recreational activities, such as a hunter waiting for game in an elevated tree stand. If the combination clothing/safety harness is used for hunting or other recreational activities, OSHA regulations do not apply, but the harness must still be capable of safely arresting a fall of the wearer.

It is to be understood that the present invention is not limited to the embodiments described above, but encompasses any and all embodiments within the scope of the following claims.

We claim:

1. A combination clothing/safety harness for arresting a fall comprising:

an upper body garment, said upper body garment having a torso portion with a back panel and a pair of front panels, a pair of armholes defined therebetween, and a collar, said upper body garment defining an interior and an exterior;

a harness attached to said interior of said upper body garment, said harness including a D-ring;

at least one back strap, said back strap having an upper portion, a center portion, and a lower portion;

a D-ring attachment strap extending upward from said upper portion of said back strap, said D-ring attachment strap securing said D-ring to said back strap;

a pair of arm encircling straps, each arm encircling strap encircling said armholes;

a horizontal arm strap connecting said center portion of said back strap to each of said pair of arm encircling straps;

a belt connecting to said bottom portion of said back strap, said belt having a central portion stitched to said rear panel of said upper body garment, and a pair of detached end portions corresponding to said pair of front panels, each of said end portions having mating buckle portions; and a pair of front crotch straps and a pair of rear crotch straps attached to said central portion of said belt, said front and rear crotch straps each having mating buckle portions.

2. The combination clothing/safety harness according to claim 1, wherein said rear crotch straps are longer than said front crotch straps.

3. The combination clothing/safety harness according to claim 1, further comprising at least one D-ring attached to said upper body garment and said belt.

4. The combination clothing/safety harness according to claim 1, further comprising at least one label having indicia designating said upper body garment as containing a safety harness.

5. The combination clothing/safety harness according to claim 1, wherein said upper body garment is a jacket.

6. The combination clothing/safety harness according to claim 1, wherein said upper body garment is a vest.

7. A fall arresting device for reducing bodily injuries to a person due to elevated falls, said device comprising:

a harness for encircling body portions of a wearer for maintaining the wearer in a substantially vertical disposition, said harness including a garment including an interior and an exterior;

first strap means for encircling the arms of the wearer about the shoulders fixedly attached to said interior of said garment;

second strap means for encircling the legs of the wearer about the crotch fixedly attached to said interior of said garment;

third strap means for coupling said first means and said second means symmetrically, said third strap means disposed at the back of the wearer; and means for coupling to a safety line extending to said exterior of said garment;

wherein said means for coupling being fixedly attached to said third means.

8. The fall arresting device according to claim 7, said garment further including a torso portion having a back panel, a pair of front panels, and a pair of armholes;

said first strap means includes a pair of straps fixedly attached to said interior of said garment encircling said armholes and a horizontal arm strap coupled between said pair of straps and fixedly attached to said interior of said garment, said second means including another pair of straps, each one of said another pair of straps having a releasible coupling therein, said another pair of straps securely depending from said garment; said garment further including a belt strap fixedly attached to said back panel of said garment for encircling the torso of the wearer, and said belt strap having a pair of ends, each one of said ends having a mating buckle thereon.

9. The fall arresting device according to claim 8, said garment being a jacket.

10. The fall arresting device according to claim 8, said garment being a vest.

11. The fall arresting device according to claim 7, said garment further including a back panel, a front panel, and a pair of legs;

said first strap means includes a pair of straps fixedly attached to said interior of said garment encircling the arms of the wearer about the shoulders, said pair of straps having a releasible coupling therein;

said second strap means being fixedly attached to each one of said pair of legs of said garment and extending from said first strap means.

12. The fall arresting device according to claim 11, said garment being overalls, wherein said front panel includes a bib.

13. The fall arresting device according to claim 7, said garment further including coveralls having a torso portion having a back panel, a pair of front panels, a pair of armholes, and a pair of legs; said first strap means, said second strap means, and said third strap means being fixedly attached to said interior of said coveralls.

14. The fall arresting device according to claim 7, wherein said means for coupling being a D-ring.

* * * * *